Jan. 19, 1937.  G. G. LANDIS ET AL  2,068,551
DYNAMO-ELECTRIC MACHINE CONTROL
Filed June 21, 1934
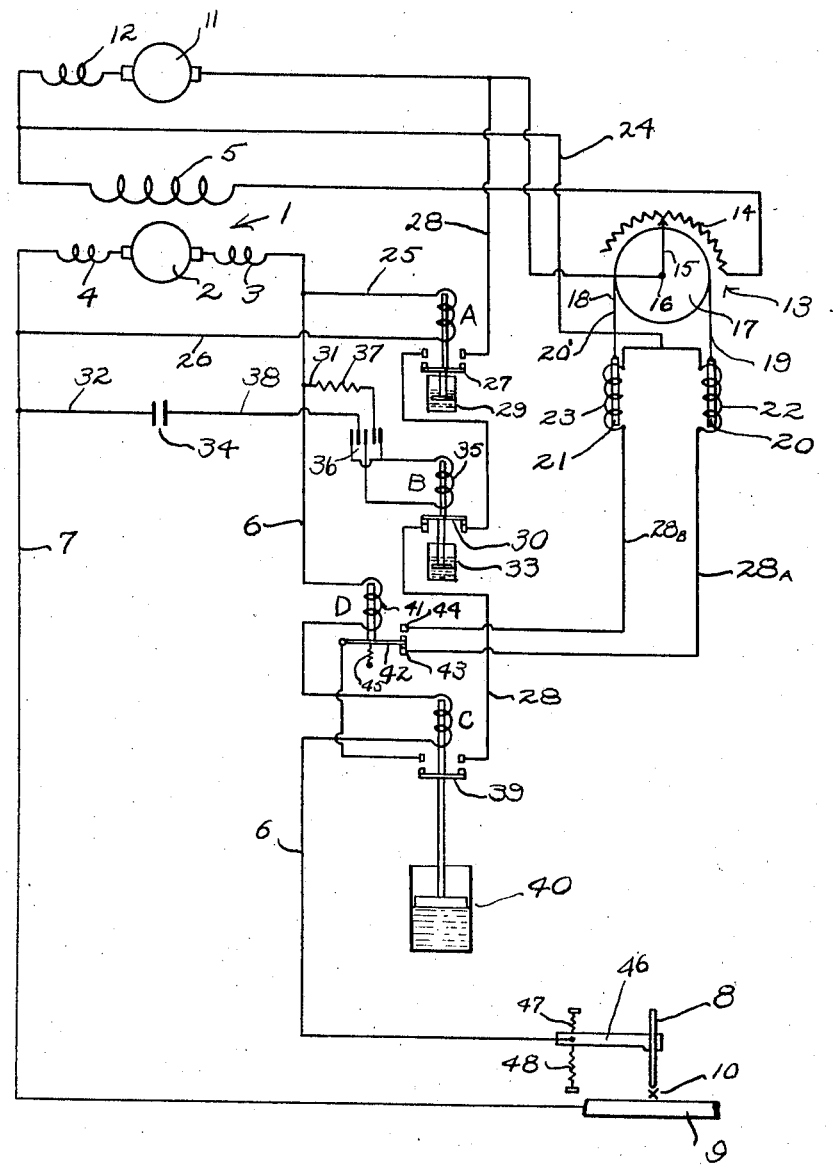
INVENTORS
George G. Landis and
BY Norman J. Hoenie
Fay, Oberlin & Fay
ATTORNEYS.

Patented Jan. 19, 1937

2,068,551

UNITED STATES PATENT OFFICE 2,068,551

DYNAMO-ELECTRIC MACHINE CONTROL

George G. Landis and Norman J. Hoenie, Cleveland, Ohio, assignors to The Lincoln Electric Company, Cleveland, Ohio, a corporation of Ohio Application June 21, 1934, Serial No. 731,782

13 Claims. (Cl. 219—8)

This invention relates as indicated to control apparatus for dynamo electric machines and pertains more particularly to a control apparatus for welding current generators.

It is an object of our invention to provide a control apparatus for welding current generators, or more particularly arc welding systems whereby the operator at the welding station may regulate or control the operating characteristics, such as the volt-ampere characteristics of the output of the generator, from the welding station.

It is a further object of our invention to provide a control system of the character described characterized by the fact that the control currents are carried by the lead from the welding current generator extending to the welding station and which normally carries the welding current.

It is a further object of our invention to provide a control system of the character described, which in its responsiveness to control currents is not affected by the ordinary changes in the volt-ampere characteristics of the welding circuit during the normal welding operation so that the setting of the generator, i. e. its output, will not be changed by the usual changes in characteristics in the welding circuit occurring during normal welding operations, such as by the usual striking of the arc as well as fluctuations which occur due to the conditions existing in the arc itself. Other objects of our invention will appear as the description proceeds.

To the accomplishment of the foregoing and related ends, said invention, then, consists of the means and steps hereinafter fully described and particularly pointed out in the claims; the annexed drawing and the following description setting forth in detail certain means of carrying out the invention, such disclosed means illustrating, however, but one of various ways in which the principle of the invention may be used.

In said annexed drawing:—

The single figure is a schematic wiring diagram showing a welding current generator, its exciting circuit; its associated external arc circuit and the control circuit constructed and arranged according to the principles of our invention.

Referring now more particularly to the drawing, the welding current generator, generally indicated at 1, comprises an armature 2, a series field winding 3, an inter-pole winding 4 and an exciting winding 5. The field windings 3 and 4 are connected in series with the welding circuit which comprises, in the main, leads 6 and 7, to which are respectively connected the welding electrode 8 and the work 9. During the normal welding operation an arc will be maintained at 10 between the electrode 8 and the work 9.

The exciting winding 5 of the generator is connected to some suitable source of substantial constant potential such as an exciter 11 which may have a series field 12 connected therewith, and preferably driven at a constant speed by some suitable means, such as a motor.

Connected in series with the exciting winding 5 is a variable rheostat generally indicated at 13 and comprising a resistance unit 14 and a contact arm 15. The contact arm 15 may be mounted on a shaft 16, which also carries a pulley or sheave 17. Trained about the pulley 17 is a cable 18, the opposite ends 19 and 20' of which are respectively secured to the armatures 20 and 21 positioned in solenoid coils 22 and 23, respectively.

The solenoid coils 22 and 23 are connected together at one end and by means of lead 24 are connected to one side of the source of constant potential, such as the exciter circuit of the generator 1. The other sides of the windings 22 and 23 are connected to the control circuit presently to be explained. It should be noted at this point that if the winding 22 is energized the armature 20 associated therewith will be moved downwardly and acting through the cable 18 will cause a clockwise rotation of the contact arm 15, thus reducing the amount of resistance 14 which is included in series with the exciting field 5. Conversely, if the winding 23 is energized the armature 21 associated therewith will be pulled downwardly, causing the cable 18 to rotate the contact arm 15 in a counter-clockwise direction, thus inserting a greater amount of resistance 14 in series with the exciting field 5.

The means by which the windings 22 and 23 may be selectively energized from the welding station comprises the control circuit which will now be explained.

Connected across the welding leads 6 and 7 by means of leads 25 and 26 is a relay A. The relay A has a normally open switch 27 associated therewith, which switch is in line 28 connected to a constant source of potential, such as the exciter circuit of the machine. The relay A, when energized, will close the switch 27. Associated with the relay A, i. e., the switch 27, is a dash-pot 29. This dash-pot is of the type which normally retards to slight extent the closing of the switch 27, but permits such switch to quickly open without any interference.

Likewise connected in series with the lead 28 is a normally closed switch 30. A relay B connected across the lines 6 and 7 by leads 31 and 32 will, when energized, open the switch 30. A dashpot 33 slightly retarding the closing of the switch 30 but permitting such switch to quickly open, is associated with switch 30.

The relay B includes a condenser 34, a winding 35, a rectifier conveniently of the copper oxide type, generally indicated at 36, and a resistance unit 37.

With regard to the relay B, the following special comments should be noted: When welding with so-called direct current, an oscillograph record of the volt-ampere characteristics of the welding circuit shows that the welding current voltage has a definite pulsating characteristic due to the behavior of the arc as well as an intermediate bridging of the arc space either by a stream of metallic vapor or by liquid metallic particles. The pulsating nature of the welding current voltage permits the flow of current across the condenser 34, through lead 38 and rectifier 36, winding 35, to resistance unit 37 and lead 31 back to the line 6. The copper oxide rectifier 36 is employed to rectify the A. C. current passed by the condenser. It will, therefore, be noted that current will flow in the winding 35, i. e., the relay B will be energized, only when pulsating current is flowing in the welding circuit, i. e., during the welding operation. If the welding circuit should be shorted so as to cause the flow therethrough of true direct current, i. e., non-pulsating current, the winding 35 would be deenergized.

In series with the welding lead 6 is a series relay C which is connected to a normally open switch 39 in an extension of lead 28. The switch 39 likewise has a dashpot, generally indicated at 40, associated therewith, which is of the type retarding the closing of the switch, but permitting the switch to open quickly.

The lead 28 of the control circuit extends through a selector switch relay, generally indicated at D, either through lead 28a to winding 22 or through lead 28b through winding 23 back through lead 24 to the opposite side of the exciter switch. The selector switch relay D comprises a winding 41. The switch member 42 is adapted to have contact with contact buttons 43 and 44 respectively associated with leads 28a and 28b. A spring 45 normally maintains the switch 42 in contact with the button 43.

The welding electrode 8 may be supported in a suitable holder, generally indicated at 46. The holder 46 has two resistance blocks, generally indicated at 47 and 48, associated therewith, which resistance blocks are in electrical communication with the lead 6. The resistance blocks 47 and 48 may conveniently be carbon blocks which extend in opposite directions from the holder and are so arranged that the operator may bring the same into contact with the work 9, thus shorting the welding circuit through a selected one of such blocks. The blocks 47 and 48 have different resistance values, for instance the resistance of the block 48 may be twice that of 47.

When the operator desires to effect a setting of the rheostat arm 15 in one direction or the other in order to vary the output characteristics of the generator 1 he will bring one or the other of the blocks 47 and 48 into contact with the work 9. The operation of the control system comprising our invention for effecting such movement of the rheostat arm 15 may be briefly explained as follows.

During the normal welding operation, i. e. when pulsating current as above explained, flows through the welding circuit, the relay A will close the switch 27, the relay C will close the switch 39. The pulsating current, however, will cause an energization of the relay B in the manner previously explained, opening the switch 30 so that the circuit of lead 28 through any one of the windings 22 or 23 is broken, any variations in the welding current flow, therefore, in no way affecting the setting of the rheostat arm 15. Assume now that the operator desires to move the rheostat arm 15 in a clockwise direction, he will bring the resistance block 48 into contact with the work. This will permit the flow in the welding circuit of a true uni-directional non-pulsating current. The relay A will remain energized sufficiently to maintain closed the switch 27. Due to the fact that non-pulsating current is now flowing, the relay B will not be energized so that the switch 30 will remain closed. The relay C will be energized, closing the switch 39. Due to the high resistance of block 48 the relay D will not be energized sufficiently to lift the switch arm 42, but such switch arm will remain in contact with the button 43. The circuit from lead 28 will therefore be completed through lead 28a, winding 22, lead 24, back to the opposite side of the exciter circuit, causing the armature 20 to be pulled downwardly and a movement in a clockwise direction of rheostat arm 15. Should the operator desire to move the rheostat arm 15 in a counter-clockwise direction, he will bring the block 47 into contact with the work. This will cause an energization of relay A, close the switch 27, and energization of relay C, closing the switch 39, but due to the non-pulsating character of the current flow in the welding circuit the relay B will not be energized so that the switch 30 will remain closed.

The amount of current now flowing in the welding leads, however, is sufficient for the relay D to overcome the effect of the spring 45 so that the arm 42 will be moved up into contact with the button 44 so that the control circuit from lead 28 will be completed through lead 28b, winding 23, lead 24, back to the opposite side of the exciter circuit. The armature 21 will thus be pulled downwardly, causing a counter-clockwise rotation of the rheostat arm 15.

It should be noted that when the electrode is touched to the work in order to strike the arc when the welding operation is begun or to restrike the arc during the welding operation, this will so short-circuit the relay A that it will permit switch 27 to open, opening the control circuit. Thus the striking of the arc has no effect upon the setting of the rheostat 13.

It should also be noted that under open circuit conditions, relay C will be de-energized, opening the control circuit.

In the light of the foregoing, it will be noted that we have provided a control means for an electric arc welding generator responsive to different volt-ampere characteristics of the welding circuit, which characteristics are different from each other and from the normal welding current so that the operator at the welding station may selectively vary the output of the welding current generator in opposite senses and by means which in no way interferes with the normal welding operation.

In another application, filed even date herewith, is disclosed a control circuit, in certain respects similar to the system disclosed in this application, particularly in that the results accomplished by the two systems are substantially the same. Reference is here made to that part of such co-pending application relating to the use of a single contact resistor block on the welding electrode holder and with which the work may be contacted in order to short-circuit the welding lead and to energize the control circuit. For this reason the principles of our invention are not limited to the use of two contact blocks, such as 47 and 48 disclosed in this application.

Other modes of applying the principle of our invention may be employed instead of the one explained, change being made as regards the mechanism herein disclosed, provided the means stated by any of the following claims or the equivalent of such stated means be employed.

We, therefore, particularly point out and distinctly claim as our invention:

1. An electric arc welding system comprising a welding generator, an external arcing circuit, and a control circuit, said control circuit including a relay effective upon selective energization to vary in opposite senses the output of the generator, the circuit of said relay including a normally open switch, a relay connected across the welding circuit for closing said switch, a normally closed switch, a relay connected with the welding circuit and responsive to volt-ampere characteristics of the welding circuit different from the welding current to open said last-named switch, a second normally open switch, a relay connected in series with the welding arc for closing said last-named switch, a selector switch for controlling the direction of current through said first-named relay, and another relay connected with the welding circuit and responsive to differences in the characteristics of the welding circuit for controlling said selector switch.

2. An electric arc welding system comprising a welding circuit including a welding current generator welding regulating means for varying the operating characteristics of said generator, a control circuit for said regulating means and a relay in said control circuit functionally responsive to the flow of pulsating and non-pulsating current in said circuit to respectively de-energize and energize said control circuit.

3. An electric arc welding system comprising a welding current generator, an external arcing circuit, and a control circuit, said control circuit including means for varying the operating characteristics of said generator and means functionally responsive to pulsations in current flow through an arc in the welding circuit to de-energize said control circuit.

4. An electric arc welding system comprising a welding current generator, an external arcing circuit, and a control circuit, said control circuit including means for varying the operating characteristics of said generator and means functionally responsive to the flow of pulsating and non-pulsating current in said circuit to respectively de-energize and energize said control circuit.

5. An electric arc welding system comprising a welding generator, an external arcing circuit, and a control circuit, said control circuit including a relay effective upon selective energization to vary in opposite senses the operating characteristics of the generator the circuit of said relay including a normally closed switch and a relay connected with the welding circuit functionally responsive to pulsations in the current flow through an arc in the welding circuit to open said switch.

6. An electric arc welding system comprising a welding generator, an external arc circuit, and a control circuit, said control circuit including a relay effective upon selective energization to vary in opposite senses the operating characteristics of the generator, the circuit of said relay including a normally closed switch and a relay connected with the welding circuit functionally responsive to the flow of pulsating and non-pulsating current in said circuit to respectively open and close said switch.

7. A welding system comprising a supply station including a welding generator, a welding station remote from said supply station, a conductor extending from said supply station to said welding station, means manually operable at said welding station to effect selective flow through said conductor of control currents significantly different in magnitude from each other and different in character from the welding current, means including a control circuit at said supply station for varying the volt-ampere characteristic of the generator in opposite senses selectively responsive to the different control currents in said conductor, and a relay selectively responsive to the difference in character between said control currents and the normal welding current for de-energizing and energizing said control circuit.

8. A system comprising a supply station including a generator, a station remote from said supply station, a welding circuit including a conductor extending from said supply station to said second station, means at said supply station for varying the generator output characteristic, a control circuit for said generator regulating means including said conductor, circuit-controlling means manually operable at said second station to effect flow of control currents through said conductor significantly different in magnitude from each other and different in character from the welding current, means at the supply station responsive to the control currents to control said generator-regulating means, and a relay selectively responsive to the difference in character between said control currents and the welding current for de-energizing and energizing said control circuit.

9. A welding system comprising a supply station including a welding generator, a welding station remote from said supply station, a conductor extending from said supply station to said welding station, means manually operable at said welding station to effect selective flow of control currents through said conductor significantly different in magnitude from each other, means including a control circuit at said supply station for varying the volt-ampere characteristic of the generator in opposite senses selectively responsive to the different control currents in said conductor, and a relay functionally responsive to the flow of pulsating and non-pulsating current in said conductor for respectively de-energizing and energizing said control circuit.

10. A system comprising a supply station including a generator, a station remote from said supply station, a welding circuit including a conductor extending from said supply station to said second station, means at said supply station for varying the generator output characteristic, a control circuit for said generator-regulating means including said conductor, circuit-controlling means manually operable at said second station to effect flow of control currents through said conductor significantly different in magnitude from each other, means at the supply station responsive to said control currents to control said generator-regulating means, and a relay functionally responsive to the flow of pulsating and non-pulsating current in said welding circuit for respectively de-energizing and energizing said control circuit.

11. A welding system comprising a supply station including a welding generator, a welding station remote from said supply station, a conductor extending from said supply station to said welding station, means manually operable at said welding station to effect selective flow of control currents through said conductor significantly different in magnitude from each other, means including a control circuit at said supply station for varying the volt-ampere characteristic of the generator in opposite senses selectively responsive to the different control currents in said conductor, and a relay including a condenser, a rectifier and a solenoid coil in series connected across the welding circuit for de-energizing and energizing said control circuit.

12. A system comprising a supply station including a generator, a station remote from said supply station, a welding circuit including a conductor extending from said supply station to said second station, means at said supply station for varying the generator output characteristic, a control circuit for said generator-regulating means including said conductor, a circuit-controlling means manually operable at said second station to effect flow of control currents through said conductor significantly different in magnitude from each other, means at the supply station responsive to the control currents to control said generator-regulating means, and a relay including a condenser, a rectifier, and a solenoid coil in series connected across said welding circuit for de-energizing and energizing said control circuit.

13. A welding system comprising a supply station including a welding generator, a welding station remote from said supply station, a welding circuit including a conductor extending from said supply station to said welding station, means at said supply station for varying the volt-ampere characteristic of the generator in opposite senses selectively responsive to different values of current flow in the welding circuit, and a relay functionally responsive to different types of current flow in the welding circuit for de-energizing and energizing said generator-regulating means.

GEORGE G. LANDIS.
NORMAN J. HOENIE.